United States Patent [19]

Chick et al.

[11] 4,136,365
[45] Jan. 23, 1979

[54] MAGNETIC DISC STORAGE DEVICES HAVING COMPENSATION FOR DIMENSIONAL CHANGES

[75] Inventors: David M. Chick, Aldershot; David B. Hawthorne, Windlesham, both of England

[73] Assignee: Data Recording Instrument Co. Ltd., Staines, England

[21] Appl. No.: 813,330

[22] Filed: Jul. 6, 1977

[30] Foreign Application Priority Data

Jul. 6, 1976 [GB] United Kingdom ............... 27972/76

[51] Int. Cl.² .......................................... G11B 21/08
[52] U.S. Cl. ..................................... 360/78; 318/634
[58] Field of Search ................... 360/78; 318/632, 634

[56] References Cited

U.S. PATENT DOCUMENTS 3,775,655  11/1973  Du Vall ................................. 360/78

Primary Examiner—Robert S. Tupper
Attorney, Agent, or Firm—Hane, Roberts, Spiecens & Cohen

[57] ABSTRACT

In a magnetic-disc data storage device using exchangeable discs for the recording of data on circular tracks, a reference track is provided on the disc and during interruptions in the transfer of data, a read-write head is moved to the reference track and the error in its expected position, due to dimensional changes in the disc or the storage device or due to misalignment of the head, is measured. In subsequent data tracks access the position of the head is corrected by error measured so that the head is correctly aligned with the selected data track. Measurement of the error is carried out more frequently when the error is changing rapidly.

6 Claims, 9 Drawing Figures

MAGNETIC DISC STORAGE DEVICES HAVING COMPENSATION FOR DIMENSIONAL CHANGES

BACKGROUND OF THE INVENTION

This invention relates to magnetic-disc data storage devices having movable read-write heads.

In such devices data is arranged on the discs in tracks, and a single head is movable to access a number of tracks. During a transfer the head is positioned over a track and should be aligned with it accurately. This ensures, if the head is reproducing, that it receives a signal of the maximum strength free from interference from neighbouring tracks, and, if the head is recording, that the neighbouring tracks are not overwritten and the data is positioned in the expected place for a subsequent read operation. The more accurately the head can be positioned, the closer the tracks can be packed to one another on the disc.

When the storage device uses multi-disc packs with a head for each surface and the different heads coupled together it has been proposed to devote one surface to servo tracks which the head for that surface can be caused to follow. The remaining heads can thus be brought to reproducible positions on the discs. But this arrangement is wasteful of space that could be used to carry useful data, and is impractical for disc packs with only a few data surfaces.

An alternative is to position a head by reference to a separate position transducing system mounted in the device itself. A problem which then arises is that there may be temperature differences between the disc and the rest of the apparatus. The resultant differences in expansion may impair alignment between head and track.

Such variations occur particularly during the initial period after the storage device has been started from rest and while the various elements are reaching temperature equilibrium. The problem is especially acute if the discs are exchangeable, because a cold disc pack may be placed in a warm drive unit, or a warm disc pack in a cold drive unit. While equilibrium is being established the head may not be accurately positioned over the desired track, preventing reliable recording or reproduction of data.

It has been proposed to measure the temperatures of the disc and the position transducer and apply a correction to the positioning mechanism based on the predicted expansions. But the temperatures can be measured only indirectly (for the disc from the air flowing over them and for the position transducer as the temperature of the body of the drive unit) and without taking into account differences of temperature within the parts concerned. It is also difficult to predict accurately the total rates of expansion of the assemblages of which they are made up.

SUMMARY OF THE INVENTION

This invention provides a method of data transfer between a magnetic disc and a magnetic disc data storage device having a read-write head movable over the disc and position-transducing means arranged to produce indications of the position of the head relative to the storage device which includes repeatedly carrying out check cycles each of which takes place during an interruption in the transfer of data between the head and the disc and comprises positioning the head over an area of the disc provided with means defining a position reference on the disc and obtaining signals indicative of the position of the head relative to the position reference and the head position signals and the indications from the position transducing means to derive a value or values representing the difference between the position which would be indicated by the positions transducing means for the position reference and a datum position indication; and during each access of a data track for the transfer of data modifying the position of the head as indicated by the position transducing means by the value derived in the preceding check cycle.

Thus repeated checks are carried out to discover the current position of a position reference on the disc in the position-transducers' frame of reference. The positioning of the head during following track accesses is then corrected accordingly. This provides a compensation for variations in alignment between the disc and position transducing system such as are caused by temperature variations.

Preferably the position reference is defined by the position of recorded information on the disc.

Preferably each interruption of the transfer of data at which a check cycle takes place would occur even in the absence of a check cycle. For example it may occur when the head needs to move to access a different track. A data processing system to which the storage device is attached need not even be aware that the check cycle takes place.

Preferably the check cycles do not take place at consecutive interruptions of the transfer of data. Advantageously the times at which the check cycles take place are responsive to the rate of change of the measured position of the reference position in such a manner that the slower the measured position varies the less frequently the check cycles take place. This means that as the temperature of the device approaches equilibrium after start-up or a change of disc pack the checks will take place more slowly.

The position reference may comprise at least three non-collinear reference positions, the head being positioned during the access of the data track in such a manner as to maintain the head over a track on the disc which bears a substantially fixed relationship with a locus on which the reference positions lie. Such a method of data transfer is the subject of our copending U.S. patent application Ser. No. 813,416 and may be as described in it. The method compensates for eccentricity in the data tracks, such as may arise if the disc was recorded on a different device.

The information defining the position reference may be recorded on the disc, assuming it to be exchangeable, by a method which comprises mounting the disc in the device, moving the head to a predetermined area, testing if the information is recorded in that area, and, if it is not, recording the information.

The invention also provides a magnetic-disc storage device suitable, in conjunction with a suitable disc, for carrying out the method of the invention.

The invention also provides a magnetic-disc storage device suitable for carrying out the method of the invention.

BRIEF DESCRIPTION OF THE DRAWINGS

Two forms of magnetic-disc storage device in accordance with the invention will now be described in greater detail by way of example with reference to the accompanying drawings, in which.

DESCRIPTION OF THE PREFERRED EMBODIMENTS

Figure 1:
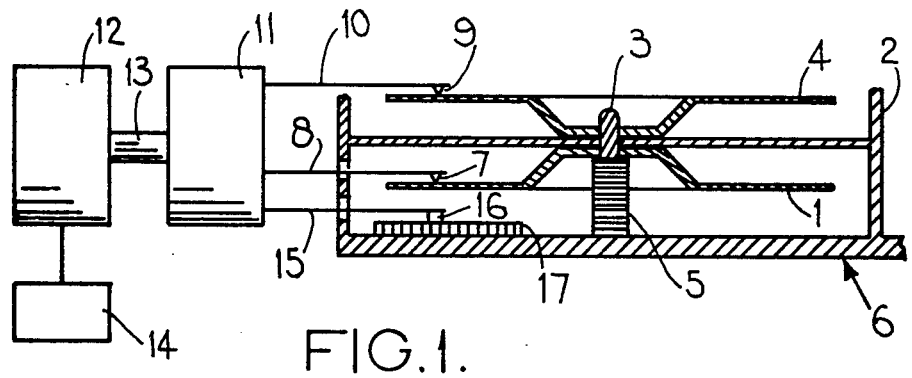
FIG. 1 is a diagrammatic view, partly in section, of both forms of storage device.

Referring to FIG. 1, the two forms of magnetic disc storage device that will be described have a similar structure for mounting the discs and read-write heads but differ in the means for controlling the head. The parts they have in common will be described first.

A fixed disc 1 is permanently mounted in the storage device beneath a casing 2. The fixed disc 1 is mounted on a spindle 3 which projects from the casing 2 and on which can be mounted an exchangeable disc 4. The spindle 3 is driven from a motor 5 mounted in the body of the storage device (shown partially at 6).

A read-write head 7 carried on an arm 8 cooperates with the fixed disc 1, and a read-write head 9 carried on an arm 10 cooperates with the exchangeable disc 4. Both arms project from a carriage 11 which is mounted on a rail (not shown) so that it can move towards and away from the centre of the discs. The carriage 11 is moved by a motor 12, for example a voice-coil motor, to an extension 13 of whose armature it is connected. The motor 12 is supplied from a servo amplifier 14.

A further arm 15 projects from the carriage 11 and carries at its end a sensor 16 which, with a scale 17 mounted on the body of the storage device, forms a position transducer. The scale 17 carries a series of parallel conductors joined at alternate ends to form a single winding; the sensor 16 carries a short section of a similar winding. A high-frequency current is passed through one, and the voltage induced in the other observed.

Nulls occur whenever the crosspieces of one are half way between those of the other and are counted as a primary indication of the position of the heads 7 and 9. Between the nulls the magnitude of the voltage provides an indication of the separation from the null position. The position transducer thus provides a direct indication of the position of the sensor 16 with respect to the scale 17, and an indirect indication of the position of the heads 7 and 9 with respect to the scale 17.

The indicated position of the heads 7 and 9 is used as one input to the servo system to control the positioning of the heads 7 and 9 during a data transfer. However, if it were the sole input the head would not be aligned with the track if the data area on the disc did not bear the expected relationship with the scale 17 or if the head was not correctly aligned with the sensor. Such misalignments can occur if there are temperature differences between the various parts, which will cause them to expand by different amounts.

The problem is less serious for the fixed than the exchangeable disc. The fixed disc is maintained in the same environment as the sensor, and careful matching of materials and mounting of the parts can ensure that they expand equally. But the exchangeable disc will often be at a different temperature from the storage device when it is first mounted on the device. Usually it will be cold while the device is warm, but it may be the other way round if the device is being started from rest. During the period while temperature equilibrium is being reached the temperature differences will be changing and the alignment of the head with the disc will vary. As will be explained, a correction is introduced into the positioning system as a compensation for these differences.

Figure 2:
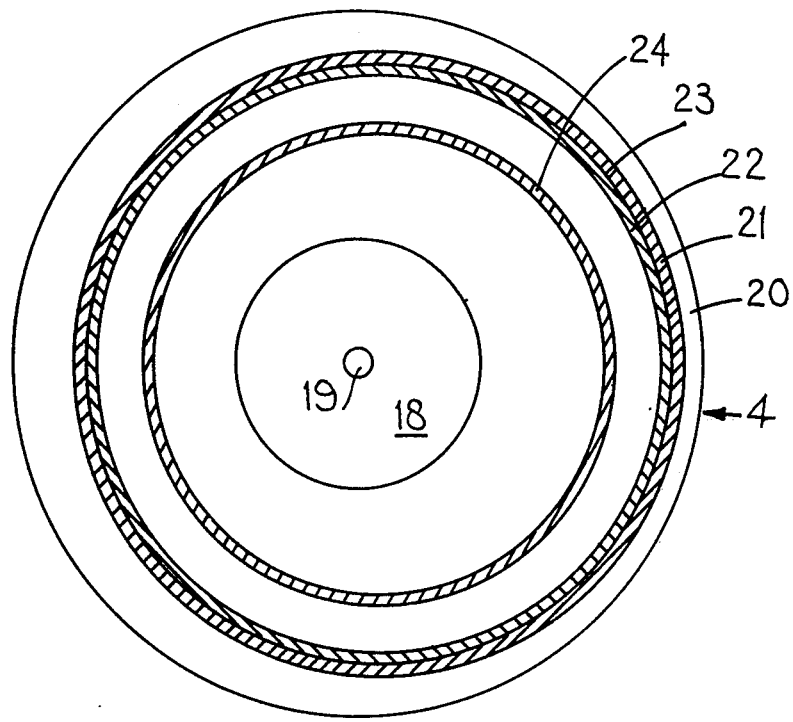
FIG. 2 is a diagrammatic view of an exchangeable disc suitable for use with the two forms of storage device.

Referring to FIG. 2, the exchangeable disc 4 has a hub 18 with a central opening 19 to fit over the spindle 3. It also has a magnetic surface 20 which, for an exchangeable disc to be used with this storage device, carries a reference track 21, and, immediately inside the track 21, a reference track 22. The boundary 23 between them forms a reference locus. The data tracks (of which an example 24 is shown) are situated inside the reference tracks 21 and 22.

Figure 9:
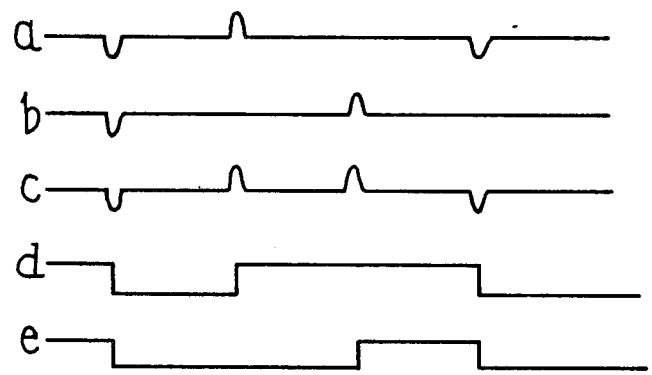
FIG. 9 shows waveforms occurring in the initialisation procedure.

If the head 9 is in the neighbourhood of the reference tracks 21 and 22 it picks up signals from them which allow its position relative to them to be derived. The two tracks are recorded with signals using the "tri-bit" system, as described for example, in IBM Journal of Research and Development, November 1974, page 506. Accurately aligned synchronizing pulses of the same sense are obtained from the two tracks 21 and 22 and are followed by two pulses in the opposite sense, one in each track, which occur at different times. (These waveforms are shown in FIG. 9 as waveforms a and b.)

Timing controls initiated by the synchronising pulses demodulate the output from the head into two channels, each containing the pulse from one track. The earlier is delayed to coincide with the later and one is subtracted from the other to give a signal indicative of the position of the head relative to the centre-line between the tracks (the locus 23). For example, if the head is equally over both tracks the pulses picked up by the head from the two tracks will be of equal strength and the final signal will be zero.

The position signal can form an input to the positioning servo system so that the head 9 is caused to follow the locus 23 between them in the known manner.

The two tracks 21 and 22 are recorded with aligned index marks which define a zero position on the circumference of the disc as it rotates.

The tracks 21 and 22 are not necessarily centred on the spindle 3. The manner in which they may be recorded on the disc will be described subsequently.

Figure 3:
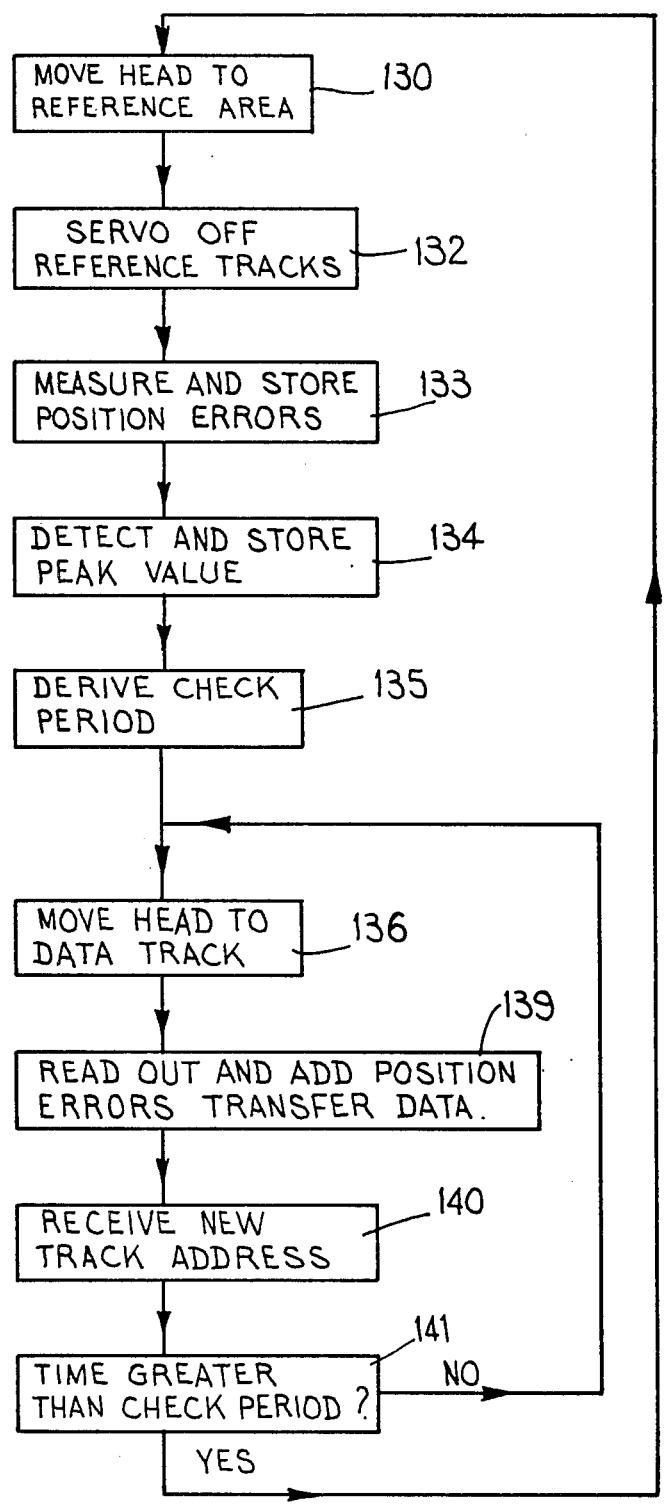
FIG. 3 is a flow-chart showing the method of data transfer used by both forms.
Figure 4:
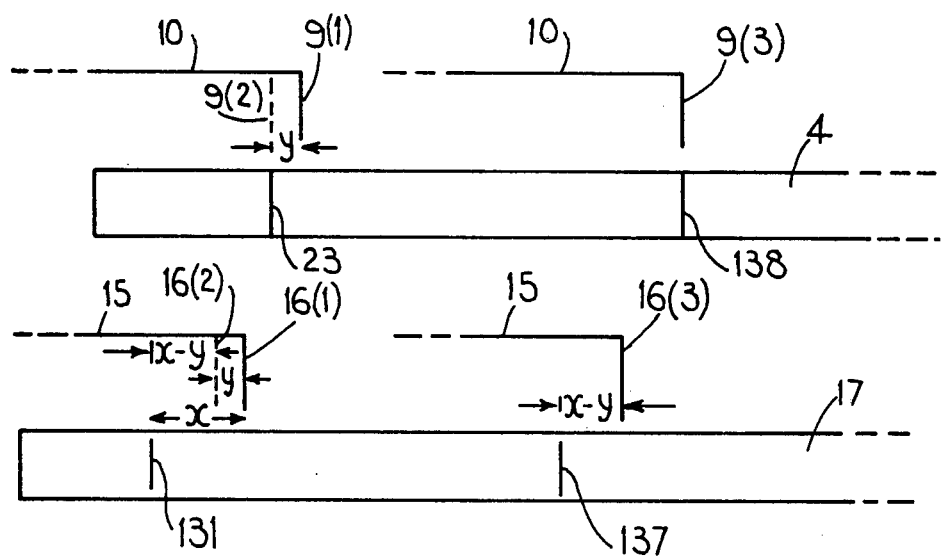
FIG. 4 is a diagram showing positional relationships between the exchangeable disc and the position-transducing scale in the two forms.

The method of transferring data used by both forms of apparatus will now be described with reference to FIGS. 3 and 4. FIG. 3 is a flow-chart of the method. FIG. 4 is a diagram showing the positional relationships between the exchangeable disc 4 and its head 9 and the scale 17 and sensor 16. It is not to scale and the various items are represented by their centre lines.

Periodically during the course of its operation the device carries out a check cycle between accesses of tracks on the exchangeable disc. Assume that a new track address has been received in the conventional manner from the device controller and that one of these check cycles is due to take place. The head 9 is moved (block 130 of FIG. 3) by the positioning servo, which is responding to the output of the position transducer, until the sensor 16 reaches a zero position 131 on the scale 17. This is the position at which, if the device and disc were both at their nominal operating temperature, the head 9 would be correctly over the reference locus 23. However, for the reasons explained, the head 9 may not be over the locus 23, although it will be in the reference area in which it can pick up signals from the tracks 21 and 22. The control of the head is therefore switched to servo off the locus 23 (block 132). The head will move to a position 9(1), which is shown displaced by an amount y from the locus 23 to represent the positional error required to operate the servo system.

At this point the sensor 16 is at a position 16(1), displaced by a distance x from the zero position 131. If the head 9 had been at the position 9(2), directly over the reference locus 23, the sensor 16 would have been at a position 16(2), displaced by a distance x-y from the zero position. This is the amount by which the indication of position produced by the position transducer is in error in representing the position of the head 9 with respect to the disc 4.

The error x-y is measured at a number of positions as the disc rotates and the values stored (block 133). Thus a record is kept which shows the radial position of the reference locus even if it is not a circle centred on the axis of rotation.

The peak of these errors is detected and its value stored (block 134). This peak is compared with the peak of the previous cycle and a duration is derived from their difference (block 135). This duration is that of a check period which determines when the next check cycle can take place. It is arranged to be smaller the greater the difference between the values from successive periods. That is, when a disc is first mounted and the position of the reference locus 23 is changing rapidly, the checks will be carried out more frequently.

The check cycle is now complete and the head 9 moves to access the data track whose address was received immediately before the check period (block 136). But instead of being brought to rest over the nominal scale position 137 that corresponds to the data track, the stored errors are read out as the disc rotates and are added as an off-set so that the positioning system aims to position the sensor 16 at 16(3), displaced by x y from the nominal position 137 (block 139). The lead 9 is then over a position 138 on the disc.

This position is displaced from the reference locus 23 by an amount equal to the separation between the scale positions 131 and 137. The head is thus positioned a reproducable distance from the locus 23, and this relationship will be maintained even if the disc expands so the the locus 23 shifts, or if the arms 10 and 15 expand by different amounts so that the head 9 is no longer aligned with the sensor 16, which would also introduce an error. The relationship will also be maintained if the disc is mounted on a different unit (or remounted on the original unit but in a different angular position) when owing to variations in the mounting arrangements the axis of rotation of the disc may shift slightly.

As an example, eight is in many cases a suitable number for the error sampling points as the disc rotates. But the number chosen depends on the accuracy of compensation required and may, for instance, be increased for greater accuracy.

As the disc rotates the data is read from or written to the track in the normal way (block 139). After the transfer has been completed instructions from the storage device controller will be received indicating a new track address (block 140). If the time that has elapsed since the check cycle is less than the check period (block 141) the head moves to this track address and corrects the head position using the stored position errors. It continues to use these errors in accessing tracks until the elapsed time exceeds the check period — that is, it cycles through the steps of blocks 136 to 141.

When a new track is requested and the elapsed time is greater than the check period (block 141), the device again carries out a check cycle, carrying out the steps of blocks 130 to 135. It then uses the new position errors until the next check cycle.

Figure 5:
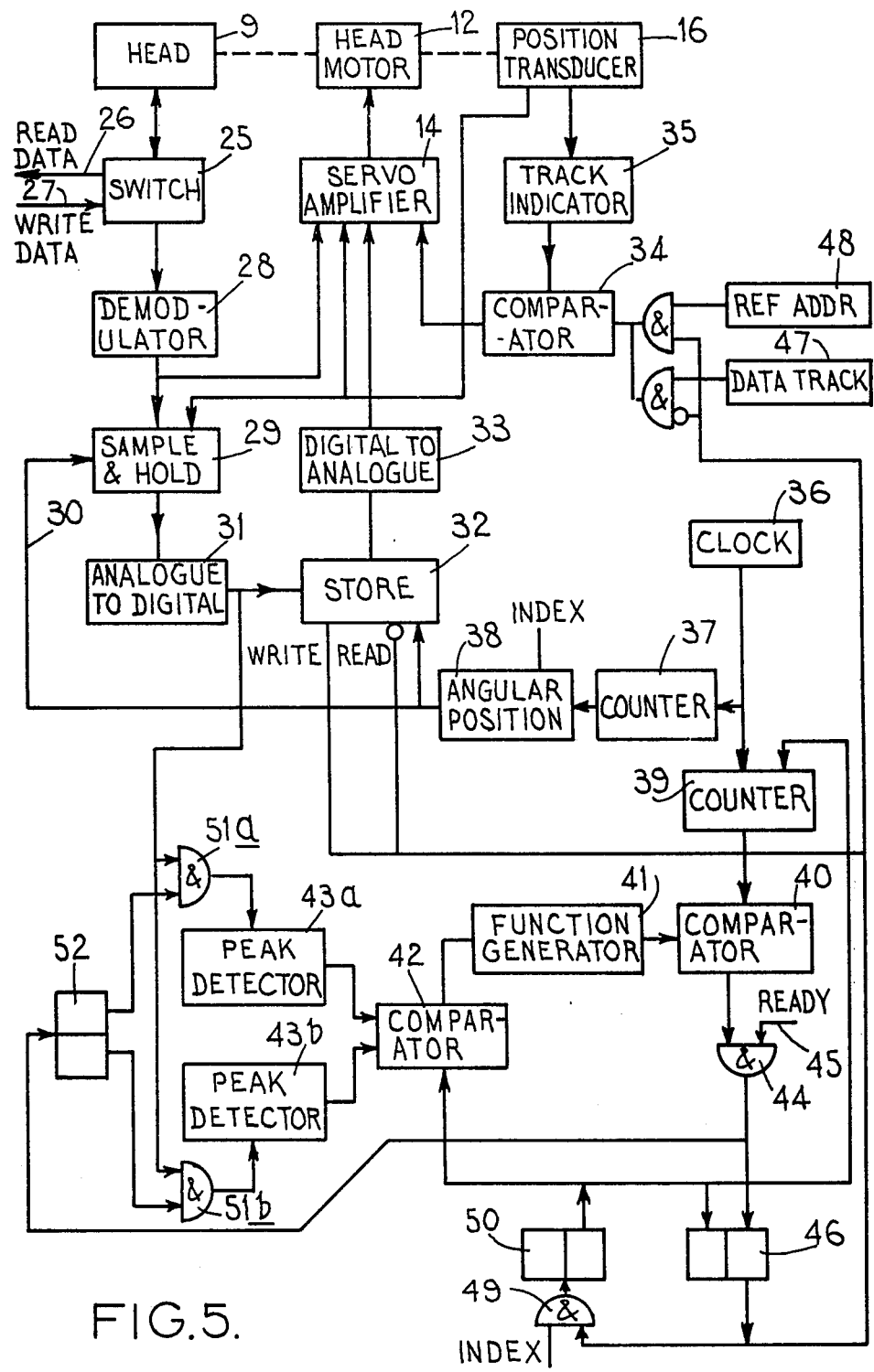
FIG. 5 is a block diagram of part of the first form.

Referring to FIG. 5, the apparatus for controlling the head of the exchangeable disc in the first form of apparatus will now be described.

The head 9 is connected to a switch 25 which during a data transfer passes on the data read by the head on a line 26 or receives write data for it on a line 27. During a check cycle the switch 25 passes the output of the head to a demodulator 28 which produces a signal indicative of the position error x of the head in the manner explained. This signal is supplied to the servo amplifier 14 so that the head can servo off the locus 23 in the known manner. It is also supplied to the negative input of a sample-and-hold circuit (a commercially available unit) 29, the positive input of which is supplied by the output y of the position transducing sensor 16 (assuming it is the sensor that produces the output rather than the scale, which is also possible). The signal from the position transducer 16 is also supplied to the servo amplifier 14 so that it can provide a fine control for the positioning system.

The sample-and-hold circuit is clocked on a line 30 and at each clock pulse retains the current value of the difference between its inputs, that is the value x-y. Distances must of course be measured in a consistent direction, so that if the head 9 comes to rest on the left of the locus 23 in FIG. 4, the value of y is indicated by a negative signal, the magnitude of which after subtraction by the input of the sample-and-hold circuit 29 is added to x.

The value x-y held by the sample-and-hold circuit 29 is converted to binary form by an analogue-to-digital converter 31 and written to a random-access store 32. The values when read out of the store 32 are supplied via a digital-to-analogue converter 33 to the servo-amplifier 14.

The servo-amplifier 14 also receives the output of a comparator 34 which compares the desired address with the current track address held in a track indicator 35, which counts the nulls from the position transducer 16. While the two addresses are different the comparator 34 issues a signal of the right sense to cause the servo-system to move the head in the required direction.

Clock pulses are produced by a crystal oscillator 36. They are divided by a counter 37, which advances a counter 38 when it reaches its maximum. The counter 38 is reset each time the index of the disc track is detected and thus holds an indication of the angular position of the disc. It controls the operation of the sample-and-hold circuit 29 via the line 30 and supplies the address signals for both storing and reading out the position errors. The locus 23 is therefore sampled at points determined by this counter.

The clock pulses are counted by a further counter 39 which is reset at the end of each check cycle and thus holds an indication of the elapsed time since a check cycle. The value of the counter is compared by a comparator 40 with the output of a function generator 41. The input to the function generator 41 is supplied by a comparator 42 which compares the values held in two peak detectors 43a and 43b, one of which holds the value from the current check cycle and the other the value from the previous check cycle.

The function generator 41 (preceded and followed by converters to and from analogue, not shown) converts the difference between the peak errors into values which can be compared with the elapsed time to give the desired relationship between the check period and the difference between peaks.

When the comparator 40 produces an output it indicates that enough time has elapsed for a check cycle to be allowed to take place. Its output goes to an AND gate 44 which also receives, on a line 45, the Ready signal which indicates that the device controller wishes to initiate a new track access. An output from the gate 44 thus indicates that both conditions for a check cycle are met. It sets a bistable 46 the output from which indicates that a check cycle is in progress. This output inhibits the desired track address supplied by the controller and held in a register 47 from being supplied to the comparator 34, and enables the supply of the address of the reference locus, which is held permanently in a register 48. The servo-system responds by moving the head to that address.

The switch 25 is operated by the first index signal detected by the head in the output of the reference tracks 21 and 22. It passes the signal from the reference tracks to the demodulator 28, from whence it is supplied to the servo-amplifier 14 so that it servos off the reference locus 23, the fine-position control signal from the position transducer 16 being disabled for the duration of check cycle by the output of the bistable 46. This output also enables the store 32 for writing, so that the position errors are written to the addresses supplied by the counter 38.

The output of the bistable 46 enables the index pulses to be passed via an AND-gate 49 to a toggle 50 which produces an output on the second index pulse detected after the start of the check cycle. This indicates that a complete revolution has taken place during which the errors have been measured and acts as a signal that the check cycle is over. It returns the switch 25 to passing read or write data and disconnects the supply of the servo-off-track error signal to the amplifier 14. It also resets the bistable 46, which has the effect of disabling the supply of the reference-locus address from the register 48 and enabling that of the data-track address from the register 47. The head then moves to this position.

The absence of an output from the bistable 46 also enables the store 32 for reading. The addresses from the counter 38 cause the appropriate errors to be read out and supplied to the servo-amplifier 14 where they balance the output of the position transducer 16. The head is thus controlled to adopt a position displaced by x-y from the position at which it would otherwise come to rest. The sign of the signal output from the converter 33 is reversed from the originally recorded so that the error signal produced by the transducer is of the same sense as that originally recorded. This ensures that the head will be, in the example of FIG. 4, to the right of the scale position, as it should be.

The signal from the toggle 50 indicating the end of the check cycle initiates the comparision by the comparator 42, of the peak values held in the peak detectors 43a and 43b. During the check cycle one only of these detectors is enabled by a gate 51a or 51b to receive the output of the analogue-to-digital converter 31. The gates 51a and 51b are enabled alternately by a toggle 52 which is triggered by the signal from the gate 44 indicating the start of a check cycle. Thus while one peak detector 43 is receiving the current values the other holds the value from the preceding period. During the check cycle the operative detector 43 compares each incoming value with the value it holds and retains the greater. Thus at the end of the cycle it holds the peak value.

The signal from the bistable 50 indicating the end of the check period resets the counter 39 to restart the count of elapsed time which will control the start of the next check cycle.

Figure 6:
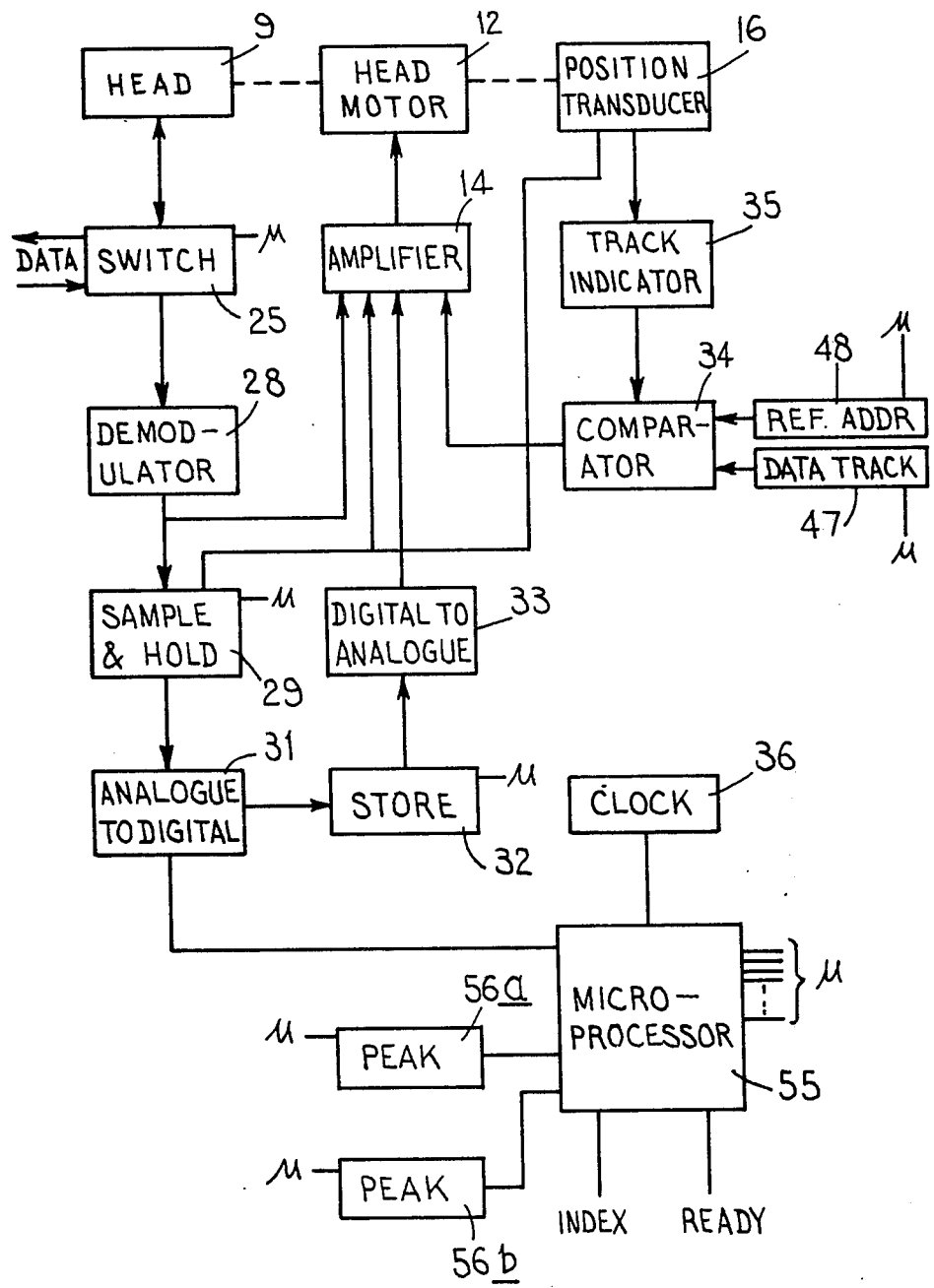
FIG. 6 is a block diagram of part of the second form.

Referring to FIG. 6, the second form of storage device uses a generally similar method to control the head, except that the control signals are provided by a microprocessor 55 rather than by logic elements. Elements that correspond to those of the first form are given the same reference numerals.

The microprocessor 55 receives the clock pulses from the clock 36 and system signals such as the index and Ready signals. It issues control signals (shown diagrammatically, and labelled u in the figure) which control the transfer of data between the elements in the same sequences as in the first form and so that it carries out the method as described with reference to FIG. 3.

The microprocessor 55 counts the clock pulses to provide an elapsed time indication similar to that from the counter 39 and an angular position indication similar to that from the counter 38. The angular position indications address the store 32 and control the sample-and-hold circuit 29 as in the first form.

The error values are supplied to the microprocessor, which determines the current peak, storing it alternately in a register 56a or 56b. It compares the two and processes them in accordance with a stored algorithm to produce the check period, which it compares with the elapsed time it counts.

Suitable microprocessors are commercially available. The actual programming of the microprocessor is by well-known techniques which do not form part of this invention.

Various changes may be made to the storage devices described.

The reference locus may be placed elsewhere, for instance in the middle of the data tracks. The reference tracks may be encoded by other methods, for instance they may be frequency encoded, or peak detection methods may be used. Values shown held in registers, like the registers 47, 48 and 56a and b may be held in locations in the store 32.

As an alternative to using inductive methods the position transducer may use optical or magnetic methods.

During the check cycle the value y of the servo-off-track error may be ignored if a lower standard of compensation is acceptable.

Instead of the described method in which during the check cycle the head servos off the reference locus, the head may be positioned by the position-transducing system with the sensor at the expected position 131 for the locus on the scale 17. The position error is then derived from the error indicated by the servo-off-track system.

If the exchangeable disc is one of a pack (or uses both surfaces of the disc to hold data) there may be reference tracks on only one surface, all the heads being coupled. Alternatively each may have its own reference tracks and may use them as described herein. This relaxes the need to align the heads. The fixed disc may also use the described method, in which case the requirements on materials and positioning to equalise expansion may be relaxed. As the fixed disc does not need to be remounted on a different unit the data tracks are not likely to be eccentric, and hence only one position check need be made during the check period. The resulting value is then used throughout the data transfer.

The error signal may be read out of the store in advance of the time in the revolution at which it was recorded. This can be arranged to compensate for the delay in the response of the positioner motor to its input. An advance of half the sampling period also gives a better approximation by averaging the departure between the discrete errors read out and the actual continuously varying error.

In the described examples the head is positioned a distance from the reference locus equal to the distance between the scale positions 131 and 137. Thus differences between the amounts this distance and the corresponding distance on the disc expand are not compensated for. But since the data area occupies only quite a small fraction of the radius of the disc this effect is small in comparison with expansion of the disc as a whole and the movement of average position of the scale. If desired, however, greater accuracy of compensation may be achieved by scaling the errors when they are read out in accordance with the radial position of the particular data track. Alternatively, the check cycle may include the checking of two reference loci, one inside and one outside the data area, in the same manner as has been described up to now for one locus. The values for the data tracks are then interpolated.

The store and its converters from and to analogue can be replaced by a delay line holding a complete revolution's worth of position error. As an example the delay line could be a charge-coupled device.

Each check cycle takes place when the device controller provides a new track address. This is an interruption in the flow of data being transferred to or from the disc that would occur in any case, even if the check cycle did not take place. The controller need not be aware that check cycles take place, and the percentage of time spent on them can be made sufficiently small not significantly to affect the operation of the device.

Using the result of the check cycle the head is positioned at a distance from the reference locus, that is substantially fixed for each track. Hence, compensation is provided for variations in the position of the locus, such for example as occur when the temperature of the disc changes. And this relationship with the reference locus is maintained even if the data track becomes eccentric with respect to the axis of rotation, as may occur if the disc is removed and remounted.

The method of initialising the exchangeable disc will now be described. When an exchangeable disc is first placed in the storage device, the device carries out a check to discover if the reference tracks are present and, if not, writes them on the disc. The positioning of the head during this step is provided by servo tracks on the fixed disc encoded as described before. For explanation it will be assumed that these tracks are at positions $-1$, $-2$ and $-3$ in the track-numbering system used for the data tracks.

Figure 7:
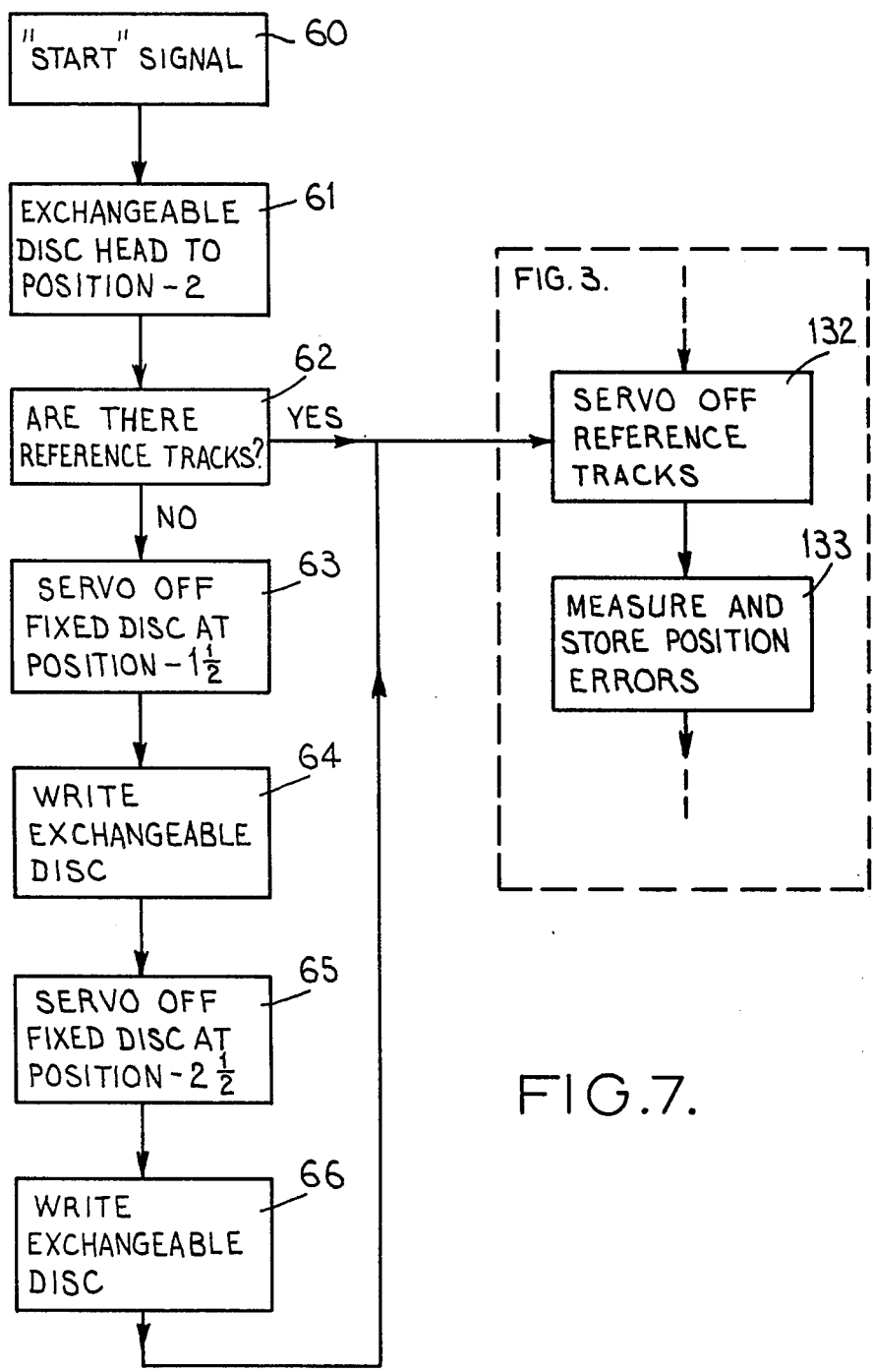
FIG. 7 is a flow-chart of the initialisation method used by both forms.

Referring to FIG. 7, assume that the exchangeable disc has just been mounted and the start signal given (block 60). The head then moves, under the control of the servo-system, to the transducer position corresponding to track $-2$ (this is the position of the reference locus if the reference tracks have been recorded) (block 61). It then reads the disc (block 62) and tests for the presence of the clock signals of the reference track (block 62).

If they are present it proceeds to servo off the reference tracks and measure the position error in the manner previously described (blocks 132 and 133 of FIG. 3) and then to continue as before. If not, it switches to servoing off fixed-disc tracks $-1$ and $-2$, following their boundary in the known manner (block 63). With the heads thus controlled it writes a reference track on the exchangeable disc at position $-1\frac{1}{2}$, deriving the write signal from the signal read from the fixed disc (block 64). It then servos off fixed-disc tracks $-2$ and $-3$ (block 65) and writes exchangeable-disc track $-2\frac{1}{2}$ (block 66). Finally it switches to servoing off the exchangeable disc at track $-2$, and continues on as before from block 132 of FIG. 3.

Thus if the exchangeable disc is already recorded with reference tracks the device will use them. If there are no reference tracks the device will record them so that they can be used as a reference for that disc in future.

Figure 8:
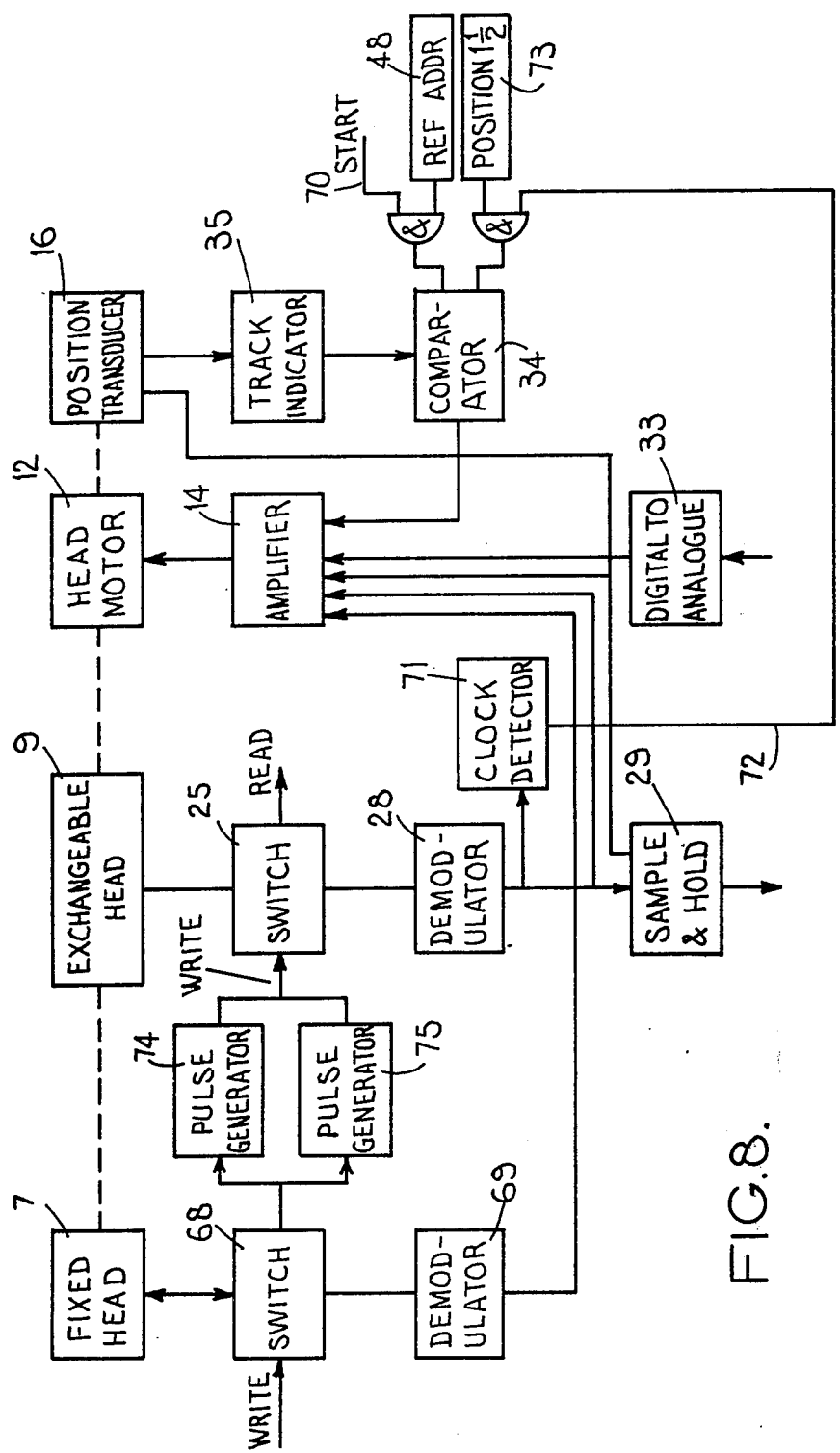
FIG. 8 is a block diagram of the part of device for controlling the initialisation procedure.

Referring to FIG. 8, the way the extra elements to carry out the initialisation procedure are introduced into the apparatus will now be described.

The fixed-disc head 7 has a similar switch 68 and demodulator circuit 69 to the switch 25 and demodulator circuit 28 of the exchangeable-disc head. The output of the fixed-disc demodulator circuit 69 supplies its output to the positioner amplifier 14 as an error signal to allow servo-following of the fixed-disc reference tracks in the normal way.

After an exchangeable disc has been mounted in the device a Start signal on a line 70 indicates that the apparatus is in a condition to transfer data. This signal gates the address of the reference locus (track $-2$ using the number given above as an example) to the comparator 34 and the heads move to this position. A circuit 71 detects the clock pulses if they are present in the output of the exchangeable-disc head 9 and allows the apparatus to proceed as before if they are. If there are no clock pulses it issues a signal on a line 72 which gates the contents of a register 73 holding the address $-1\frac{1}{2}$ of the boundary between the first pair of fixed-disc reference tracks to the comparator 34 and switches the output from the fixed-disc head 7 so that the error signal from the demodulator 69 is supplied to the positioner amplifier 14. The heads thus follow the fixed-disc track boundary. At the same time the signal read from the fixed-disc head 7 is supplied to a pulse generator 74 which produces a write signal for the exchangeable-disc head 9.

After a complete track has been written the address $(-2\frac{1}{2})$ of the other boundary of fixed-disc reference tracks is gated to the comparator from a register (not shown). The heads move to that position and follow the boundary, the servo error signal continuing to be supplied to the amplifier 14. During this revolution a second pulse generator 75 supplies a write signal for the head 9 and the reference track is written on the exchangeable disc.

Referring to FIG. 9, the signal from one of the reference tracks is as shown at a. The negative-going pulse is the clock pulse. The signal from a neighbouring track is as shown at b. The actual signal from the head superimposes them as at c. (To produce the servo input there will be a slight difference between the positive-going pulses, but it is not material to the operation of the write circuits.)

The circuit 74 responds to the clock pulse to initiate a square wave and the first positive-going pulse to complete it (d). The circuit 75 also starts a squarewave at the clock pulse but finishes it at the second positive-going pulse (e). These are the write waveforms, and will be read back again as the waveforms shown at a and b.

The timing controls are supplied either by the microprocessor (in the second form) or by separate logic elements (in the first form).

We claim:

1. A method of data transfer between a magnetic disc data storage device and a magnetic disc operatively coupled therewith, said device having a read-write head movable over the disc and position transducing means operative to produce a first position signal indicating the position of the head relative to the storage device; the method including repeatedly carrying out check cycles, each check cycle being carried out during an interruption in the transfer of data between the head and the magnetic disc, and each check cycle comprising moving the head until the position signal indicates that the head is aligned with an expected position, relative to the storage device, of a position reference on the magnetic disc; utilising the head to read a reference signal from the disc indicative of the position of the head relative to the position reference; deriving from the position signal and the reference signal an error signal representing the actual position of the position reference on the magnetic disc relative to the data storage device; storing the error signal and during a subsequent transfer of data between the head and a selected data track on the disc, the stored error signal is read out and utilised together with an address signal for the selected data track to position the head in alignment with said selected data track.

2. A method as claimed in claim 1 including comparing the error signals derived in two consecutive check cycles and utilising the result of the comparison to determine the time at which the next succeeding check cycle is to be carried out.

3. A magnetic disc data storage device including a magnetic disc carrying a position reference; a read-write head operable to transfer data to and from the disc; a head motor operable to move the head relative to the disc; position transducing means operative to generate a position signal indicative of the position of the head; checking means operable to carry out a check cycle during an interruption in the transfer of data including first means to generate a reference address signal; the head motor being operative in response to said reference address signal to move the head to a reference address at which the head is operative to read a position reference signal from the disc indicative of the position of the head relative to said position reference; second means operative in response to said position reference signal and to said position signal to generate an error signal representing the difference between the positions of said reference address and said position reference; storage means operative to store the error signal generated in one of said check cycles; means operative during transfer of data between the head and the disc to read out the error signal from the storage means and to utilise the error signal to modify a track address signal corresponding to a selected data track on the disc; said head motor being operative in response to said modified track address signal to move the head into alignment with the selected data track having a predetermined spatial relationship with said position reference.

4. A magnetic disc data storage device as claimed in claim 3 including comparator means responsive to the error signals generated in two consecutive operations of the checking means to produce an interval signal representing a time interval between the last operation and the next operation of the checking means; and in which the checking means is rendered operative at the termination of said time interval in response to said interval signal.

5. A magnetic disc data storage device as claimed in claim 3 in which drive means rotate the magnetic disc through one revolution during the operation of the checking means to carry out a check cycle and in which the second means is operative to generate a plurality of error signals corresponding to a sequence of angular positions of the magnetic disc; the error signals are stored by the storage means and are read out from the storage means during the transfer of data and are used to modify the track address signal in synchronism with rotation of the disc through said angular positions.

6. A magnetic disc data storage device as claimed in claim 5 including means to store the maximum error signal generated in each of two consecutive operations of the checking means and comparator means responsive to the stored maximum error signals to produce an interval signal representing a time interval between the last operation of the checking means and the next operation of the checking means; and in which the checking means is rendered operative at the termination of the time interval in response to said interval signal.

* * * * *